United States Patent
O'Neill et al.

(10) Patent No.: US 11,428,336 B2
(45) Date of Patent: Aug. 30, 2022

(54) BALL FLOAT VENT VALVE

(71) Applicant: Caterpillar Inc., Peoria, IL (US)

(72) Inventors: William N. O'Neill, Eureka, IL (US);
Bruno L. Risatti, Lemont, IL (US);
Michael A. Zolvinski, Bolingbrook, IL (US); Bill F. Erdman, Saint Charles, IL (US); Dayao Chen, Bolingbrook, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/112,624

(22) Filed: Dec. 4, 2020

(65) Prior Publication Data
US 2022/0178457 A1    Jun. 9, 2022

(51) Int. Cl.
*F16K 24/04* (2006.01)
*F15B 13/02* (2006.01)

(52) U.S. Cl.
CPC .......... *F16K 24/046* (2013.01); *F15B 13/023* (2013.01)

(58) Field of Classification Search
CPC ...... F16K 24/042; F16K 24/046; F16K 31/22; F16K 15/021; F16K 15/04; F16K 27/0245; Y10T 137/3068; F16T 1/22; F01P 11/038; F16N 39/002
See application file for complete search history.

(56) References Cited

U.S. PATENT DOCUMENTS

| | | | | |
|---|---|---|---|---|
| 391,163 A | * | 10/1888 | Krauss ...................... | F16T 1/14 137/188 |
| 2,409,220 A | * | 10/1946 | Melichar ................ | F16K 15/04 137/38 |
| 3,796,230 A | * | 3/1974 | Meripol ................ | F16K 15/048 137/533.11 |
| 3,969,092 A | * | 7/1976 | Huffman ............ | B01D 19/0063 96/164 |
| 4,155,374 A | * | 5/1979 | Diehl ...................... | F16K 15/04 137/519.5 |

(Continued)

FOREIGN PATENT DOCUMENTS

| | | | | |
|---|---|---|---|---|
| CN | | 2079399 U | 6/1991 | |
| DE | | 102007025682 A1 | * 12/2008 | ............. F16K 31/22 |

(Continued)

OTHER PUBLICATIONS

Written Opinion and International Search Report for Int'l. Patent Appln. No PCT/US2021/061102, dated Mar. 16, 2022 (14 pgs).

*Primary Examiner* — Hailey K. Do
(74) *Attorney, Agent, or Firm* — von Briesen & Roper, s.c.

(57) ABSTRACT

A ball float vent valve includes a valve body having an inlet port, an outlet port and an axial passageway there-between. The passageway may be defined by a cylindrical inlet chamber, a cylindrical outlet chamber and a tapered seat connecting the inlet chamber and outlet chamber. The outlet chamber may include an annular retaining groove proximate the outlet port. A spherical float may be positioned in the outlet chamber. The float may be dimensioned to seal the passageway when seated on the tapered seat. A retainer positioned in the retaining groove may include an outer crescent region having a plurality of apertures, a center region dimensioned to retain the float in the outlet chamber, and a linking region connecting the outer region to the center region.

20 Claims, 9 Drawing Sheets

(56) References Cited

U.S. PATENT DOCUMENTS

| | | | |
|---|---|---|---|
| 4,306,580 A * | 12/1981 | Wallquist | F02M 37/0023 137/192 |
| 4,742,842 A * | 5/1988 | Garneau | F24D 3/1008 137/172 |
| 5,042,519 A * | 8/1991 | Kerlin | B60K 15/03519 137/43 |
| 5,666,989 A | 9/1997 | Roetker | |
| 6,283,148 B1 * | 9/2001 | Spears | F04B 53/1005 137/533.11 |
| 6,564,820 B2 * | 5/2003 | Christman | F02C 7/232 137/192 |
| 2008/0000543 A1 * | 1/2008 | Iwami | B60K 15/03519 141/325 |
| 2010/0175760 A1 | 7/2010 | Stuart | |
| 2012/0159911 A1 * | 6/2012 | Maloney | B01D 46/2411 55/385.3 |
| 2019/0070954 A1 | 3/2019 | Mukasa | |
| 2019/0105584 A1 | 4/2019 | Sasaki | |
| 2020/0088316 A1 * | 3/2020 | Schrumpf | F16H 57/0449 |

FOREIGN PATENT DOCUMENTS

| | | | | |
|---|---|---|---|---|
| EP | 1795790 B1 | 12/2008 | | |
| EP | 3415803 B1 | 3/2020 | | |
| GB | 518346 A * | 2/1940 | | F16K 31/22 |
| GB | 2264994 A * | 9/1993 | | F16K 31/08 |
| JP | 10318203 A | 12/1998 | | |
| JP | 4906215 B2 * | 3/2012 | | F16K 24/044 |

* cited by examiner

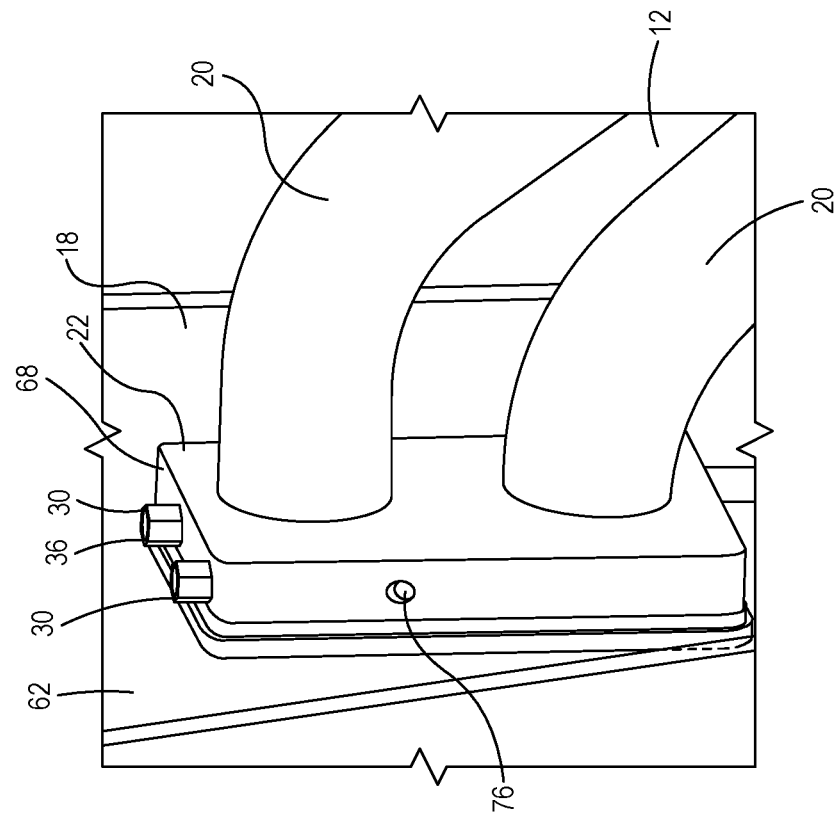
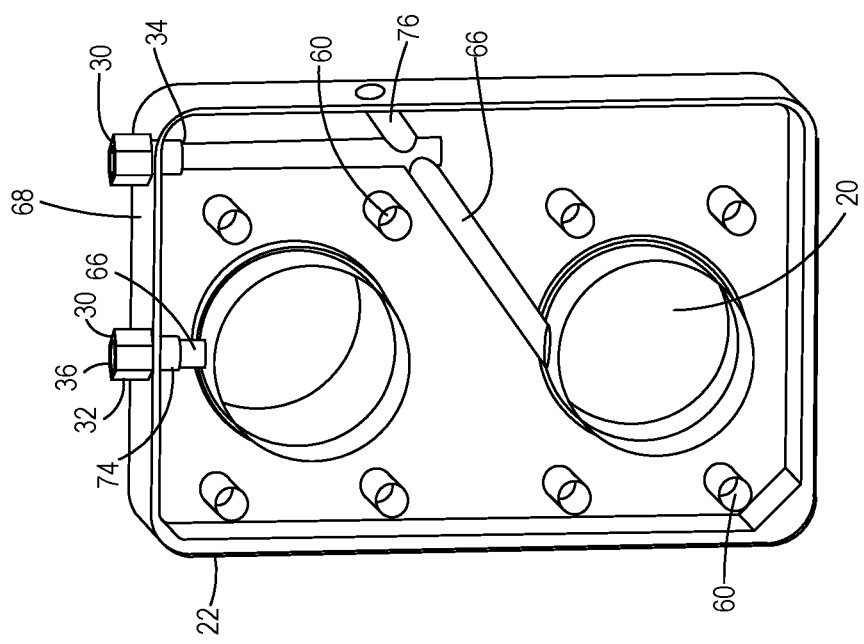

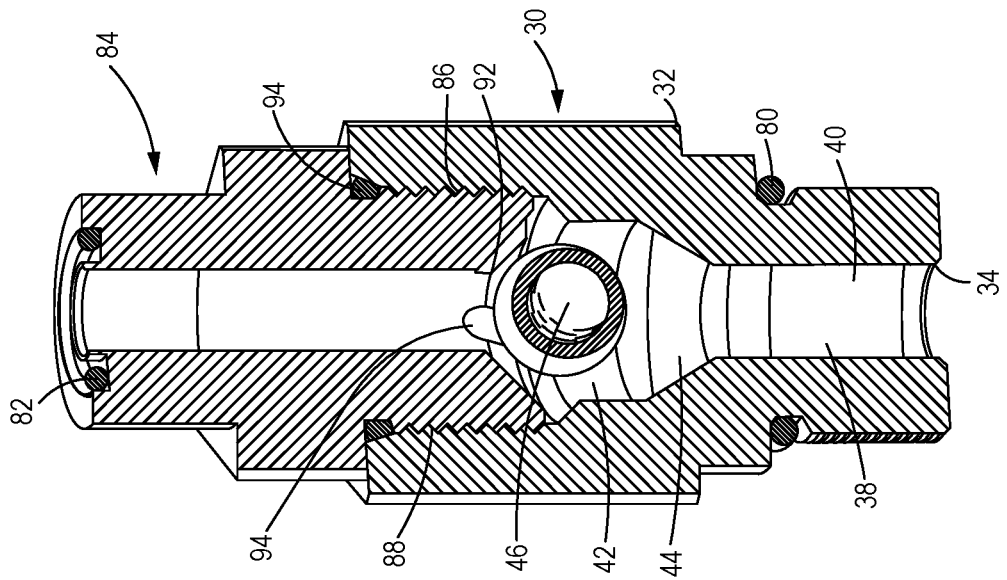
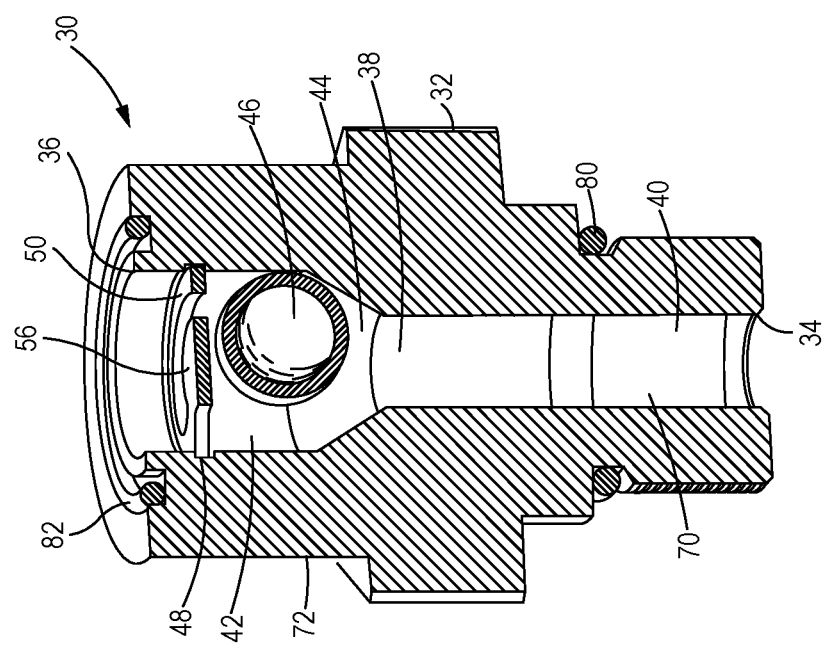

BALL FLOAT VENT VALVE

TECHNICAL FIELD

The present disclosure relates generally to vent valves, and, more specifically, to a vent valve for a hydraulic system.

BACKGROUND

The presence of air in the working fluids of a work machine can cause considerable performance and durability problems that can even result in malfunctioning or early component failure on a machine. For example, abnormal noise in a hydraulic system is often caused by trapped air. Sometimes, arranging the individual components of the hydraulic system in a specific manner can alleviate these issues. However, the design of hydraulic pump suction lines and hydraulic tank design requirements do not always make it possible to remove all the air trapped between the hydraulic tank and an inlet to the hydraulic pump. If air is trapped between the hydraulic tank and the hydraulic pump, it may eventually be forced through the pump during operation at high pressure. This can cause severe erosion of hydraulic pump components, excessive noise and critical system failures. Even if all the air is initially purged from the hydraulic pump suction lines, air often escapes from the hydraulic fluid during operation, and can accumulate in the lines.

Prior attempts to eliminate air from hydraulic systems have been directed to solutions that attempt to separate air bubbles trapped in hydraulic fluid. For example, U.S. Pat. No. 7,105,044 discloses a cyclone chamber that is hung within the fluid tank. After passing through a filter, bubbles remaining in the hydraulic fluid gather at a center top of the hydraulic fluid in the cyclone chamber, where a swirling current is generated. The bubbles are expelled through an exhaust flow path under the internal pressure of the cyclone chamber.

Such systems and methods described above do not provide a universal solution to the problem of expelling air trapped in fluid systems, as different work machine and vehicle models utilize components of varying size and shape to fit specific needs. There is consequently a need for the present ball float vent valve.

SUMMARY

In accordance with one aspect of the present disclosure, a ball float vent valve is disclosed. The ball float vent valve may include a valve body having an inlet port, an outlet port and an axial passageway there-between. The passageway may be defined by a cylindrical inlet chamber, a cylindrical outlet chamber and a tapered seat connecting the inlet chamber and outlet chamber. The outlet chamber may include an annular retaining groove proximate the outlet port. A spherical float may be positioned in the outlet chamber and may be dimensioned to seal the passageway when seated on the tapered seat. The ball float vent valve may also include a retainer positioned in the retaining groove. The retainer may include an outer crescent region having a plurality of apertures, a center region dimensioned to retain the float in the outlet chamber, and a linking region connecting the outer region to the center region.

In accordance with another aspect of the present disclosure, a hydraulic system of a work machine is disclosed. The hydraulic system may include a tank having a plurality of walls and configured to hold a supply of hydraulic fluid. A pump may be fluidly connected to the tank. The hydraulic system may also include a suction tube coupled to one of the plurality of walls of the tank. The suction tube may be fluidly connected to a suction line extending between the pump and the tank. Finally, the hydraulic system may include a ball float vent valve fluidly coupled to the suction tube. The ball float vent valve may include a valve body having an axial passageway defined by an inlet chamber, an outlet chamber and a tapered seat therebetween. A spherical float positioned in the outlet chamber may be dimensioned to seal the passageway when seated on the tapered seat. The ball float vent valve may also include a retainer positioned in the outlet chamber and dimensioned to retain the float in the outlet chamber.

In accordance with yet another aspect of the present disclosure, a hydraulic system for a work machine is disclosed. The hydraulic system may include a tank configured to hold a supply of hydraulic fluid, a pump fluidly connected to the tank, a suction line coupled to the pump and the tank, and a ball float vent valve fixed to the suction line. The ball float vent valve may include a valve body having an axial passageway defined by an inlet chamber, a outlet chamber and a tapered seat therebetween. A float may be positioned in the outlet chamber. The ball float vent valve may also include a retainer positioned in the outlet chamber and dimensioned to retain the float in the outlet chamber.

These and other aspects and features of the present disclosure will be better understood upon reading the following detailed description, when taken in conjunction with the accompanying drawings.

BRIEF DESCRIPTION OF THE DRAWINGS

FIG. 7 is a side perspective view of a portion of a hydraulic tank and ball float vent valve constructed in accordance with an embodiment of the present invention.

FIG. 8 is a side perspective view of a portion of a hydraulic tank and ball float vent valve constructed in accordance with an embodiment of the present invention.

FIG. 10 is a side perspective sectional view of a ball float vent valve constructed in accordance with an embodiment of the present invention.

FIG. 11 is a side perspective sectional view of a ball float vent valve constructed in accordance with an embodiment of the present invention.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
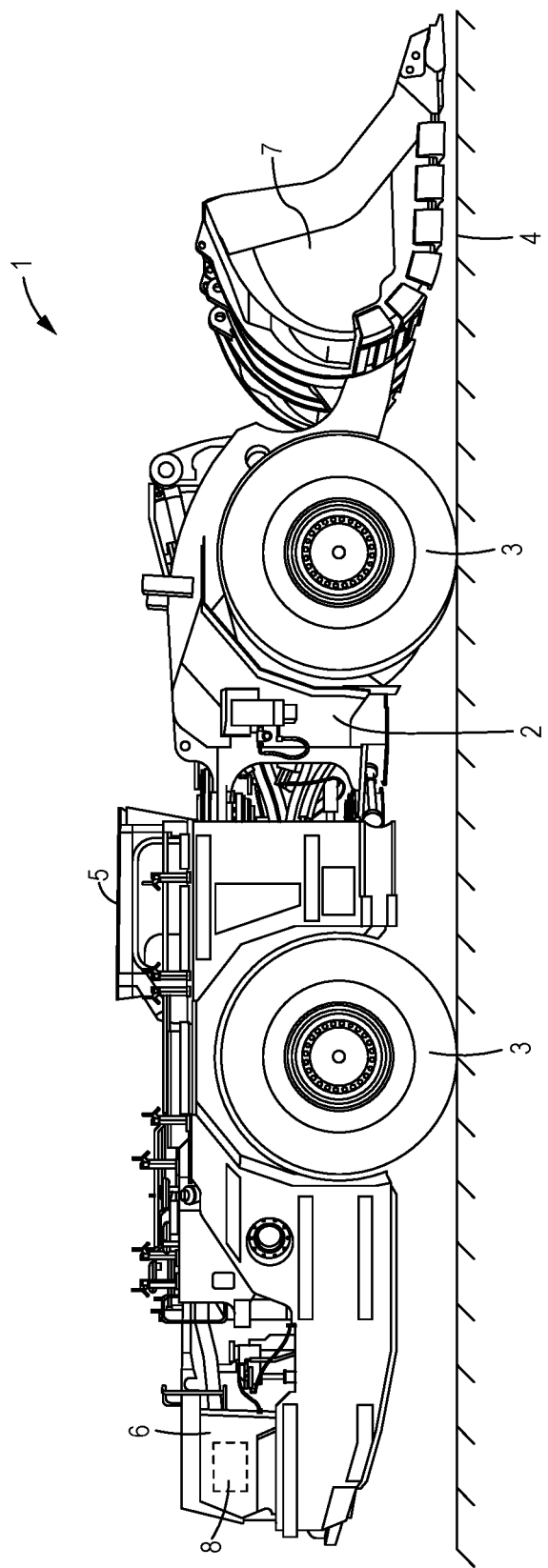
FIG. 1 is a side view of a work machine, according to an embodiment of the present disclosure.
Figure 2:
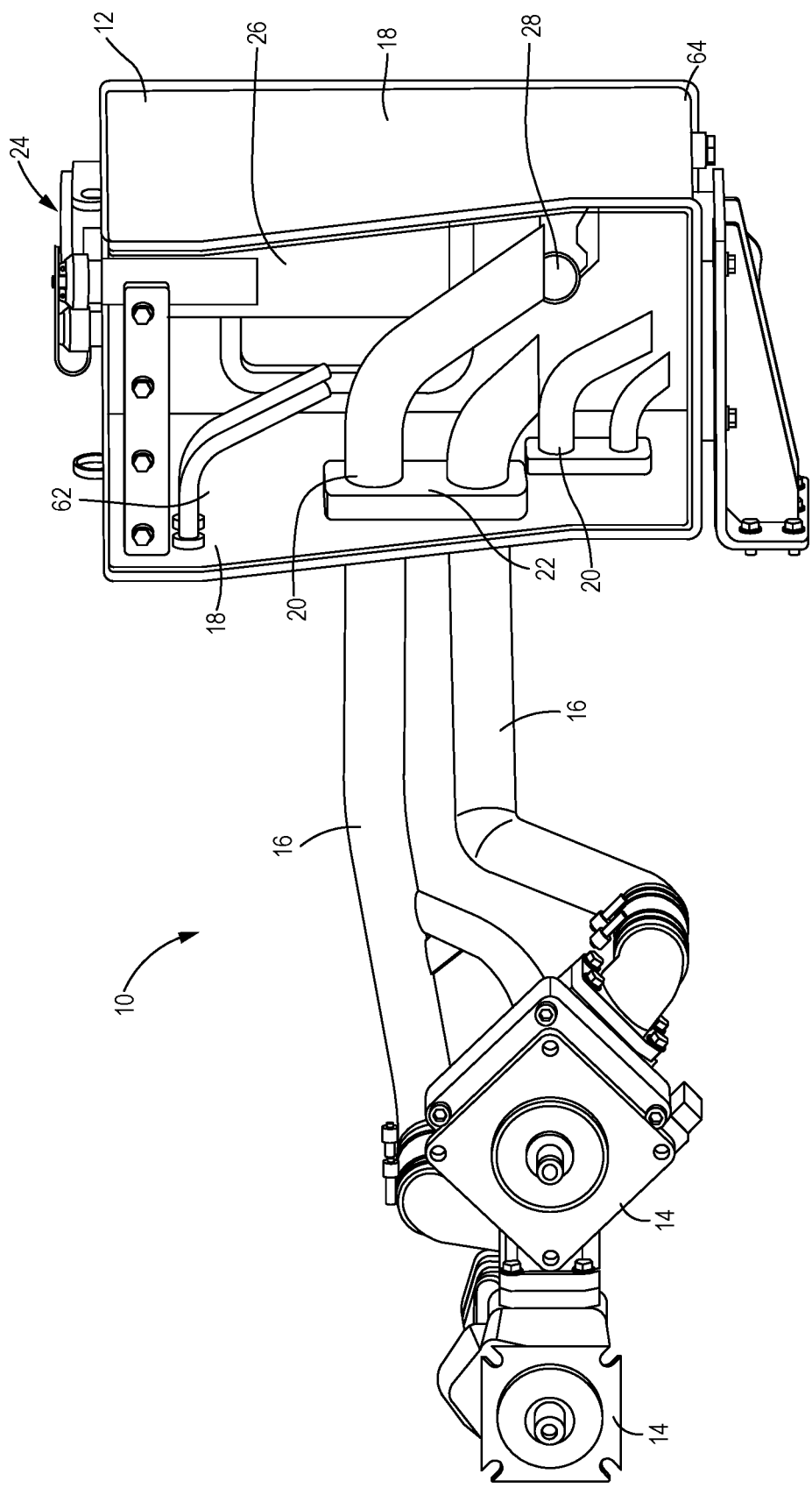
FIG. 2 is a side perspective view of a portion of a hydraulic system of a work machine constructed in accordance with an embodiment of the present invention.
Figure 4:
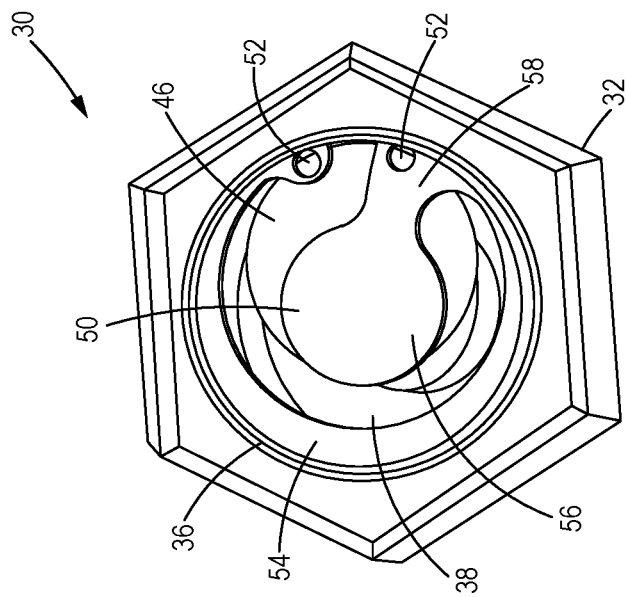
FIG. 4 is a top perspective view of a ball float vent valve constructed in accordance with an embodiment of the present invention.
Figure 3:
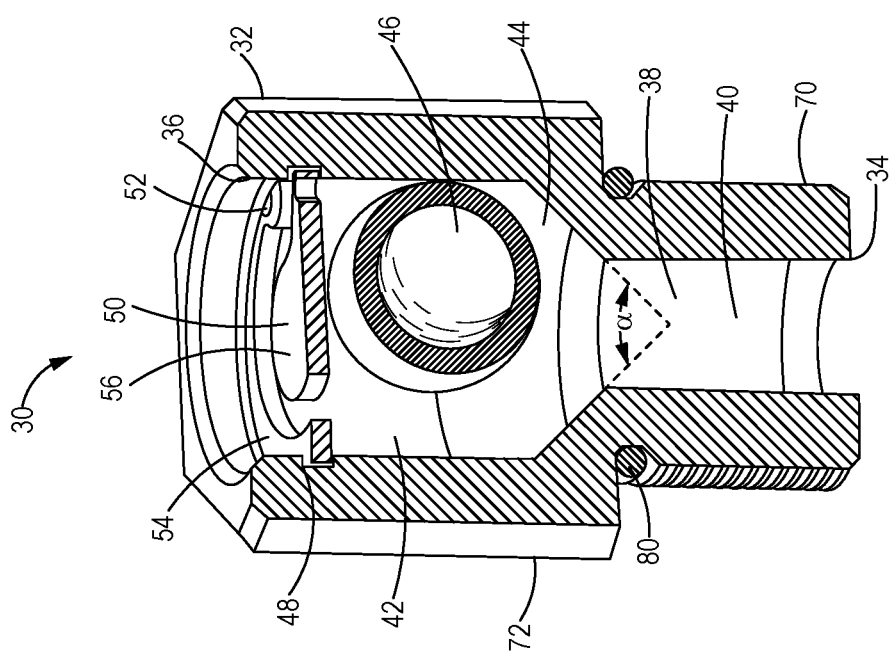
FIG. 3 is a side perspective sectional view of a ball float vent valve constructed in accordance with an embodiment of the present invention.
Figure 6:
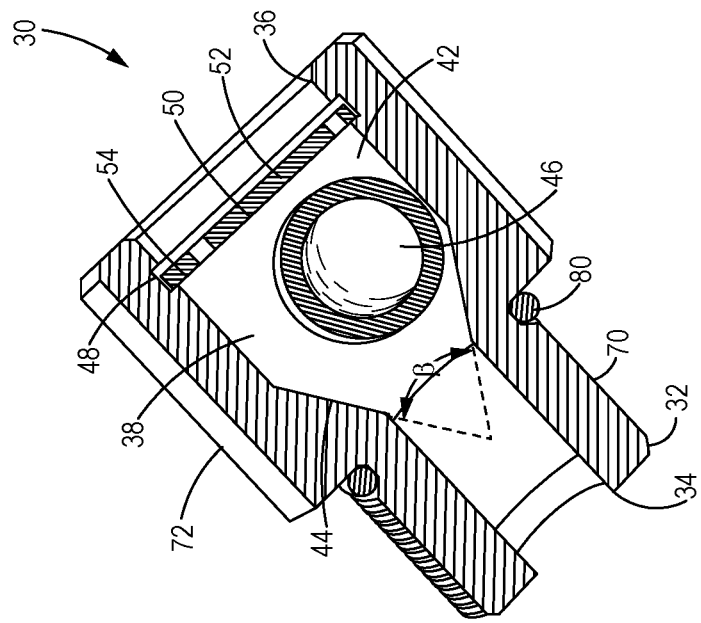
FIG. 6 is a side perspective sectional view of a ball float vent valve constructed in accordance with an embodiment of the present invention.
Figure 5:
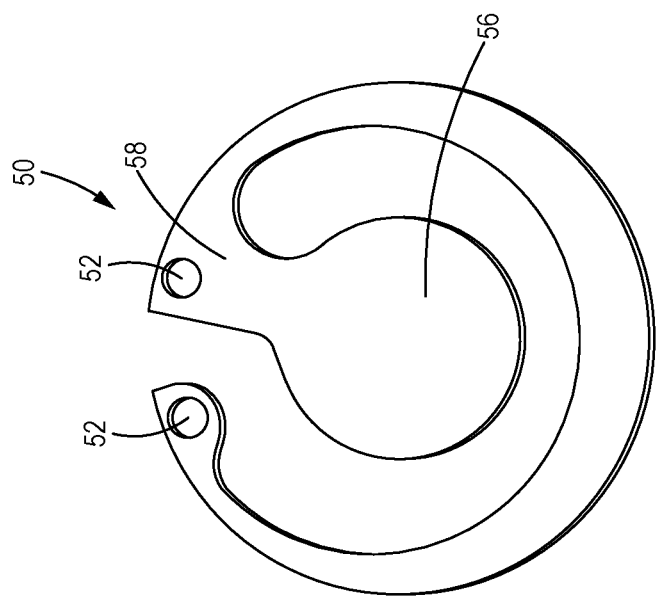
FIG. 5 is a top perspective view of a snap ring of a ball float vent valve constructed in accordance with an embodiment of the present invention.
Figure 9:
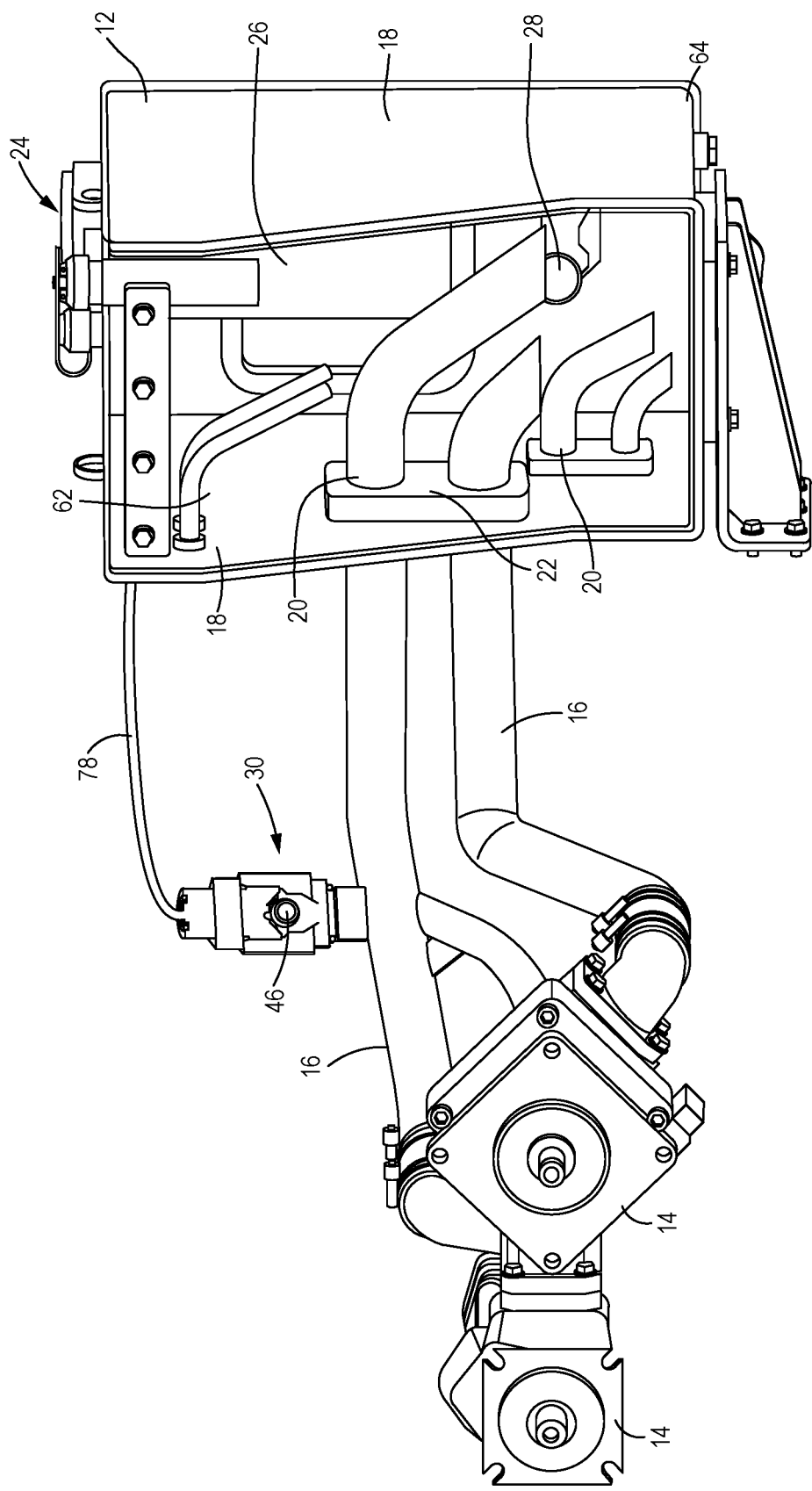
FIG. 9 is a diagrammatic representation of a portion of a hydraulic system having a ball float vent valve constructed in accordance with an embodiment of the present invention.

FIG. 1 illustrates a side view of a work machine 1, according to an embodiment of the present disclosure. The exemplary work machine 1 may be a vehicle such as a Load Haul Dump (LHD) loader adapted for underground mining applications, although the features disclosed herein may be utilized with other types of machines, regardless of the type of work performed by the machine. The illustrated work machine 1 generally includes a frame 2 that supports one or more traction devices 3 configured to engage a ground surface 4 of a worksite, an operator cab 5, and a prime mover 8 that may be housed within an enclosure 6. The prime mover 8 may produce mechanical and/or electrical power output, which may be converted to hydraulic power in the form of pressurized fluid via a hydraulic system 10 (FIG. 2). The pressurized fluid may be subsequently converted into a mechanical motion to operate various components of the work machine 1. The work machine 1 may further include a work tool 7, (e.g., a bucket), or other auxiliary structure and may lift and tilt relative to the work machine. Alternatively, or additionally, the work tool 7 may pivot, rotate, slide, swing, or move in any other manner known in the art.

FIG. 2 illustrates a side perspective view of a portion of the hydraulic system 10 of the work machine 1, according to an embodiment of the present disclosure. The exemplary hydraulic system 10 may be representative of the hydraulic system of the work machine 1 illustrated in FIG. 1, but may also be representative of the hydraulic system such as a loader, shovel, grader, or dump truck, although the features disclosed herein may be utilized with other types of machines, regardless of the type of work performed by the machine. The hydraulic system 10 may include a tank 12 holding a supply of fluid and at least one pump 14 configured to produce a variable flow of pressurized fluid. The pump 14 may embody a variable displacement pump or another type of pump configured to produce a variable flow of pressurized fluid. The pump 14 may also be drivably connected to the prime mover 8 of the work machine 1 by, for example, a countershaft, a belt, an electrical circuit, or in any other suitable manner.

The fluid held in the tank 12 may include, for example, hydraulic oil, engine lubrication oil, transmission lubrication oil, or any other fluid known in the art. Each pump 14 may draw fluid from the tank 12 via a suction line 16. One or more hydraulic systems within the work machine 1 may draw fluid from, and return fluid to, the tank 12. It is also contemplated that the hydraulic system 10 may include multiple separate fluid tanks, as necessary. The tank 12 may include a plurality of walls 18 and a plurality of suction tubes 20 that may be coupled to the suction lines 16 and other outlet lines (not shown) via one or more mounting blocks 22. Hydraulic fluid may return to the tank 12 via a return line 24 that may include a filter 26 and an outlet 28.

During normal operation, the flow rates of the pump 14 may not keep air purged from the suction lines 16 or other hydraulic lines (not shown). Similarly, machine dynamics, such as operating on grades or machine acceleration, combined with a flow surge, may draw large air bubbles in the hydraulic fluid toward the pump 14. Even if all air is purged from the hydraulic lines after the tank 12 is filled, any air entrained in the hydraulic fluid may come out of the solution over time, and form an air bubble large enough to be drawn into the pump 14. Large air bubbles may cause damage to the components of the hydraulic system 10 over time. It is consequently imperative that air bubbles have a means to escape the suction lines 16 and suction tubes 20 of the hydraulic system 10 so as to prevent damage to the hydraulic system and the individual components thereof.

FIGS. 3-6 illustrate a ball float vent valve 30 for use in the hydraulic system 10, constructed according to an embodiment of the present disclosure. The valve 30 may allow air out of the suction tube 20 or the suction line 16, while preventing air from reentering the suction tube or line. The valve 30 may include a body 32 with an inlet port 34 and an outlet port 36, which define opposing ends of an axial passageway 38 extending through a center of the housing. More specifically, the passageway 38 may include an inlet chamber 40 and an outlet chamber 42. The inlet chamber 40 and outlet chamber 42 may be generally cylindrical, although other shapes are also contemplated, and connected by a tapered seat 44. The outlet chamber may include a ball float 46, which when seated in the tapered seat 44, seals the inlet chamber 40. Finally, the outlet chamber 42 may include an annular retaining groove 48, which may be dimensioned to accommodate a retainer 50, as will be described in further detail below.

As illustrated, the present ball float 46 may be spherical and hollow to ensure buoyancy of the ball float in hydraulic fluid. In one embodiment, the ball float 46 may be made of polypropylene plastic, but other examples of oil resistant material suitable for use include polyamides, such as Nylon 6/6. The ball float 46 may be dimensioned such that oil and air may flow around it within the outlet chamber 42. For example, the ball float 46 may be 10 mm in diameter. As mentioned above, the ball float 46 may also be dimensioned such that when seated on the tapered seat 44, the inlet chamber 40 is sealed from the entrance of fluid or air that may flow backwards from the outlet port 36 toward the inlet port 34. To accomplish this, the angle α (FIG. 3) or β (FIG. 6) of the tapered seat 44 is considered. Specifically, work machines having the hydraulic system 10 may operate on slopes or grades up to 60° or more. These slope operations may lower the hydraulic fluid level on one side of the tank 12, and may drop hydraulic fluid level below the valve 30, causing the ball float 46 to seat. To accommodate this, and ensure a proper seat of the ball float 46 on the tapered seat 44, the angle of the tapered seat may have an angle α (FIG. 2) of 90° or an angle β (FIG. 5) of 60°.

The retainer 50 may ensure both air and fluid may flow through the passageway 38 freely, while also ensuring the ball float 46 is retained within the outlet chamber 42. The retainer 50 may be made of metal, and may, for example, be stamped or laser cut, although other methods of manufacture are also considered. The retainer 50 may include at least two apertures 52 positioned in an outer ring 54 of the retainer, and a center region 56 connected to the outer ring via a linking region 58. During installation of the retainer 50 in the valve 30, the apertures 52 may be drawn together, contracting the retainer 50, and thereby reducing its diameter. The retainer 50 may then be inserted through the outlet port 36 and aligned with the annular groove 48. Once aligned, the apertures 52 may be released, and the retainer 50 may expand into the groove 48 for secure installation in the valve 30. The outer ring 54 may consequently be crescent shaped, to ensure stability, while also permitting flexibility during installation. The center region 56 of the retainer 50 may be smooth and flat, to ensure any contact with the ball float 46 does not damage the structural integrity of the ball float. In one embodiment, the diameter of the center region 56 of the retainer 50 may be 7 mm, but other sizes and configurations are also considered.

Referring now to FIGS. 7 and 8, in certain models of work machines utilizing the hydraulic system 10, it may be advantageous to install the valve 30 on the suction tube 20 in an interior of the tank 12. As illustrated, suction tubes 20 are coupled to the suction lines 16 (FIG. 2) through a mounting block 22. The mounting block 22 may be fixed to an interior surface 62 of a wall 18 of the tank 12 by welding, or by other means known in the art. Similarly, the suction tubes 20 may be fixed to the mounting block 22 by welding, for example, using a 3 mm fillet weld, or by other means known in the art. The mounting block 22 may include a plurality of bore holes 60 dimensioned to accommodate a plurality of fasteners (not shown), such as bolts, for fixing the suction lines 16 on an exterior surface 64 of the tank 12 opposite the mounting block 22. Each suction tube 20 may be coupled to a valve 30 via a passage 66 formed in the mounting block 22.

The body 32 of the valve 30 includes a lower region 70 with a threaded exterior and an upper region 72. As illustrated, the upper region 72 may have a hexagonal exterior to aid in installation of the valve, such as by wrench, although other configurations may be considered as well. During installation into the mounting block 22, the threaded lower region 70 of the valve 30 may threadingly engage a threaded bore hole 74. The bore hole 74 may be proximate an end of a passage 66 that enables a fluid connection between the suction tube 20 and the valve 30. As further illustrated in FIGS. 7 and 8, an exhaust port 76 may also be formed in the mounting block 22. In the event the level of hydraulic fluid in the tank sits above the exhaust port 76, for example, the exhaust port may assist in providing an additional exit for air bubbles released from the hydraulic fluid.

Referring now to FIGS. 9-12, in an alternative embodiment, it may be advantageous to install the valve 30 on the suction line 16, exterior to the tank 12. In this arrangement, the valve 30 may be installed directly on the highest point in the suction line 16. A vent line hose 78 may be coupled to the outlet port 36 of the valve 30 to connect the valve to the tank 12. Preferably, the vent line hose 78 should have a constant rise back to the tank 12 to eliminate the chance of an air bubble being trapped by oil between the valve 30 and the tank.

The valve 30 may include a lower sealing ring 80 and an upper sealing ring 82. The upper region 72 of the valve 30 and the upper sealing ring 82 may form an O-ring face seal (ORFS) constructed in accordance with SAE J1926-2. The vent line hose 78 may then be coupled to the outlet port 36 of the valve, and the upper sealing ring 82 ensures a leakproof seal. Similarly, the lower sealing ring 80 ensures a leakproof seal when threadably installed in the suction line 16. In one embodiment, the threaded lower region 70 of the valve may be a straight thread O-ring (STOR) connection.

Figure 12:
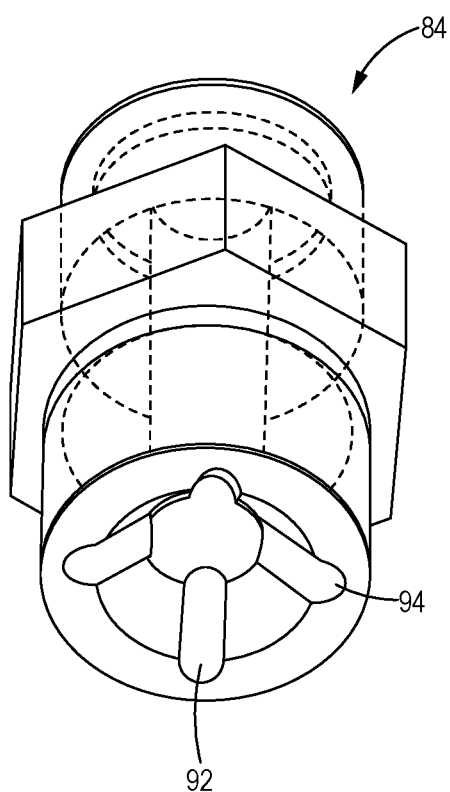
FIG. 12 is a bottom perspective view of a ball float vent valve constructed in accordance with an embodiment of the present invention.

With specific reference to FIGS. 11 and 12, in another embodiment, to accommodate the coupling of the vent line hose 78 to the valve 30, a hose fitting 84 may be used. The hose fitting 84 may include an external threaded surface 86 that is constructed in accordance with SAE J1453 with a straight thread O-ring (STOR) connection and adapted to threadingly engage a threaded outlet region 88 of the valve 30. In other embodiments, the hose fitting 84 and valve 30 may be adapted to threadingly engage other types of adaptors and fittings and other threaded components with either external threaded surfaces or internal threaded surfaces as will be appreciated by one skilled in the art. To seal the threaded engagement between the threaded surface 86 of the hose fitting 84 and the threaded outlet region 88, a sealing ring 90 may be used.

In the embodiment illustrated in FIGS. 11 and 12, the hose fitting 84 may include a tapered upper seat 92 for the ball float 46. The tapered upper seat 92 may include a plurality of notches 94 extending axially along a length of the seat. In this manner, the ball float 46 may be pushed against the upper seat 92 by a flow of hydraulic fluid, but the fluid and/or air may still escape around the ball through the notches in the seat.

Figure 13:
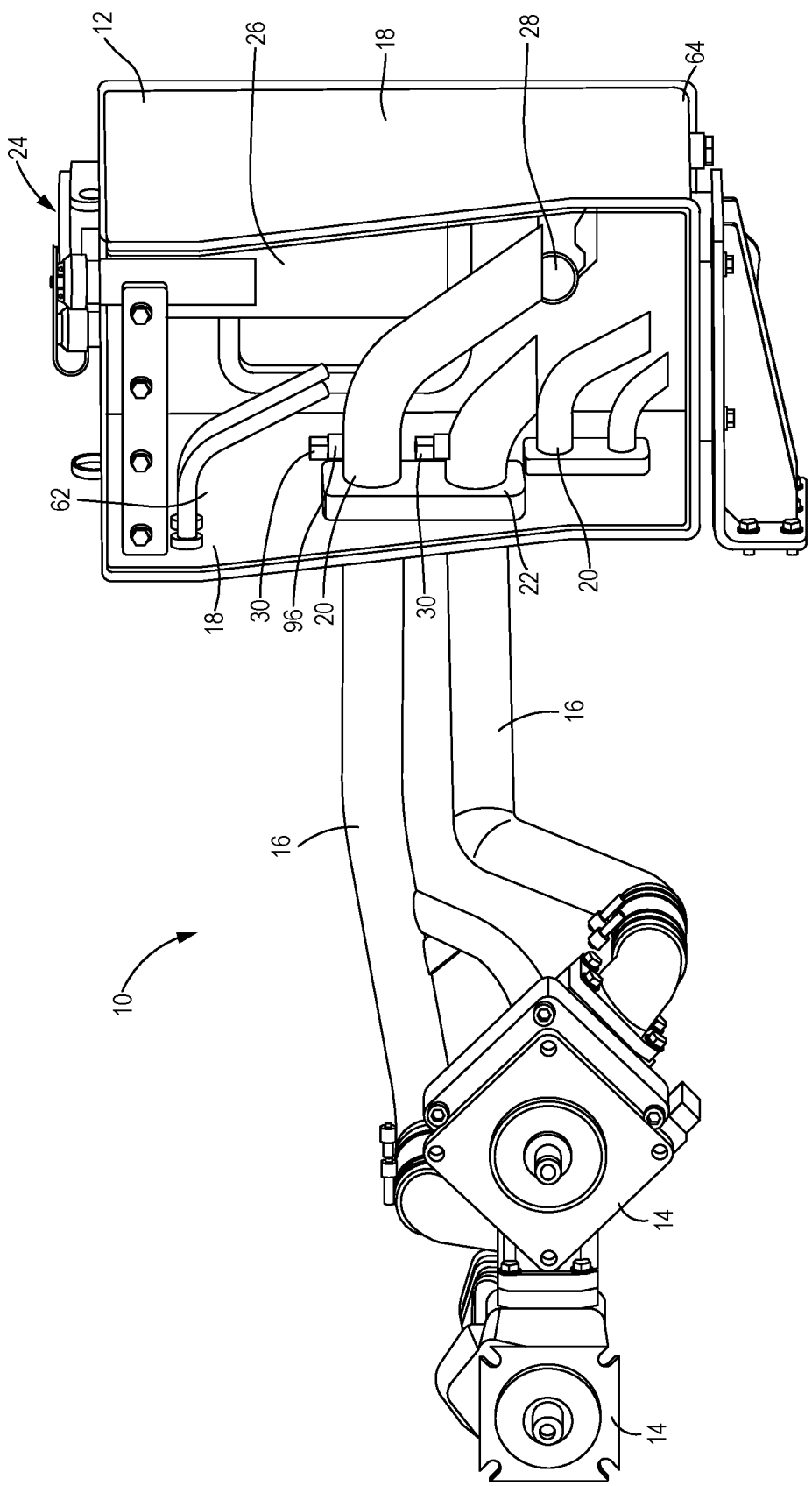
FIG. 13 is a side perspective view of a portion of a hydraulic system of a work machine constructed in accordance with an embodiment of the present invention.

In an alternative embodiment, as illustrated in FIG. 13, it may be advantageous to install the valve 30 directly on the suction tube 20. The valve 30 may be installed on the suction tube 20 using a weld boss 96. The weld boss 96 may be aligned with an aperture (not shown) in the suction tube 20 and fixed to the suction tube via stud welding, or any other welding technique known in the art. An interior surface (not shown) may be threaded, so as to matingly engage the threaded exterior of the lower region 70 of the valve 30, such that the valve may be installed in the weld boss 96 by aligning the threads of the valve and the weld boss, and rotating the valve until it is secured.

INDUSTRIAL APPLICABILITY

In operation, the present disclosure finds utility in various industrial applications, such as, but not limited to, in transportation, mining, construction, industrial, earthmoving, agricultural, and forestry machines and equipment. For example, the present disclosure may be beneficial to work machines that utilize hydraulic systems, including, but not limited to loaders, shovels, graders, and dump trucks. The present disclosure provides a ball float vent valve for allowing air out of a suction tube or line, while preventing air from reentering the suction tube or line. The present ball float vent valve greatly improves pump reliability, and reduces machine warranty.

In accordance with the embodiments described in the present disclosure, the present ball float vent valve 30 may be coupled to a hydraulic fluid line extending between a hydraulic fluid tank 12 and a pump 14. The line may include a suction line 16 that extends from an exterior surface 64 of one wall 18 of the tank 12 to the pump, which may be coupled to a suction tube 20 that extends from an interior surface 62 of the wall 18 of the tank into the hydraulic fluid stored in the tank. The valve 30 may be in fluid communication with the suction tube 20 by installing the valve on a mounting block 22 of the suction tube 20; alternatively, the valve 30 may be in fluid communication with the suction line 16 by directly installing the valve on the suction line.

Regardless of the location of the valve 30, the present ball float vent valve 30 includes a ball float 46. At rest, the ball float 46 may be seated in a tapered seat 44. When seated, the valve 30 is in a closed position, whereby the passageway 38 is sealed from fluid and air traveling from an outlet port 36 toward an inlet port 34. Differential air pressures and buoyancy in the hydraulic fluid may cause the ball float 46 to float upward from its seated position, thereby opening the valve 30 and allowing fluid and air to flow out of the suction line 16 or tube 20. In this manner, the fluid and air may flow unidirectionally from the inlet port 34 towards the outlet port 36. While fluid and air are flowing through the valve 30, the ball float 46 may be retained in the valve via a retainer 50 or an upper seat 92. The retainer 50 includes a center region 56 to retain the ball float 46 in the valve 30, while still permitting air and fluid to flow around the ball float and toward the outlet port 36. Similarly, an upper seat 92 function is a comparable manner to retain the ball float 46 in the valve 30, while still permitting air and fluid to flow through a plurality of notches 94 toward the outlet port 36.

Typically, the valve 30 may open before the work machine 1 is started. If air bubbles accumulate in the suction line 16 or tube 20 over time during operation, the valve 30 may allow the air to exit the suction line 16 or tube 20 during slack times in pump 14 flow demand, thereby preventing the air bubbles from reaching a critical size that would then cause them to be drawn into the pump. Levels of hydraulic fluid in the tank 12 may change greatly during normal machine operation. If the valve 30 is installed inside the tank 12, when, or if, a level of hydraulic fluid in the tank 12 falls below the valve 30, the ball float 46 may be reseated in the tapered seat 44, thereby closing the valve 30 and preventing air from reentering the suction tube 20, and thereby prevents the pump 14 from losing prime. The valve 30 also thereby maintains a pump priority if unexpected hydraulic fluid loss were to drop the level of hydraulic fluid in the tank 12 below lesser priority suction line inlets. As disclosed above, even when the machine is operating on a grade or sloped surface, due to the taper of the tapered seat 44, the ball float 46 will still properly seat and close the valve 30.

While aspects of the present disclosure have been particularly shown and described with reference to the embodiments above, it will be understood by those skilled in the art that various additional embodiments may be contemplated by the modification of the disclosed machines, systems and assemblies without departing from the scope of what is disclosed. Such embodiments should be understood to fall within the scope of the present disclosure as determined based upon the claims and any equivalents thereof.

What is claimed is:

1. A ball float vent valve, the ball float vent valve comprising:
    a valve body having an inlet port, an outlet port and an axial passageway there-between, the axial passageway defined by a cylindrical inlet chamber, a cylindrical outlet chamber and a tapered seat connecting the cylindrical inlet chamber and the cylindrical outlet chamber, the cylindrical outlet chamber including an annular retaining groove proximate the outlet port;
    a spherical float positioned in the cylindrical outlet chamber, the spherical float dimensioned to seal the axial passageway when seated on the tapered seat; and
    a retainer positioned in the annular retaining groove, the retainer including an outer crescent-shaped region, a center region dimensioned to retain the spherical float in the cylindrical outlet chamber, and a linking region extending radially between the outer region and the center region, the outer crescent-shaped region including a plurality of apertures.

2. The ball float vent valve of claim 1, wherein an angle of the tapered seat is 60 degrees.

3. The ball float vent valve of claim 1, wherein the spherical float is hollow and made from one of polypropylene plastic and Nylon 6/6.

4. The ball float vent valve of claim 1, wherein the valve body further includes a hexagonal exterior surface proximate the outlet port, and a threaded exterior surface proximate the inlet port.

5. The ball float vent valve of claim 4, wherein the valve body and the retainer are made of metal.

6. A hydraulic system of a work machine, the hydraulic system comprising:
    a tank configured to hold a supply of hydraulic fluid, the tank having a plurality of walls;
    a pump fluidly connected to the tank;
    a suction tube coupled to one of the plurality of walls of the tank, the suction tube fluidly connected to a suction line extending between the pump and the tank; and
    a ball float vent valve fluidly coupled to the suction tube, the ball float vent valve including:
        a valve body having an axial passageway defined by an inlet chamber, an outlet chamber and a tapered seat therebetween;
        a spherical float positioned in the outlet chamber, the float dimensioned to seal the axial passageway when seated on the tapered seat; and
        a retainer positioned in the outlet chamber and dimensioned to retain the spherical float in the outlet chamber, the retainer including an outer crescent-shaped region, a circular center region, and a linking region extending radially between the center region and the outer region.

7. The hydraulic system of claim 6, wherein the ball float vent valve is installed on the suction tube via a weld boss.

8. The hydraulic system of claim 6, wherein the retainer includes an outer crescent region connected to a center region dimensioned to retain the spherical float in the outlet chamber.

9. The hydraulic system of claim 6, further including a mounting block fixed to one of the plurality of walls, the suction tube coupled to the mounting block.

10. The hydraulic system of claim 9, wherein the mounting block includes a passageway extending between a top surface of the mounting block and the suction tube.

11. The hydraulic system of claim 10, wherein a portion of an interior surface of the passageway proximate the top surface of the mounting block is threaded.

12. The hydraulic system of claim 11, wherein a lower region of an exterior of the valve body is threaded.

13. The hydraulic system of claim 12, wherein the threaded lower region of the exterior of the valve body matingly engages the threaded interior surface of the passageway.

14. A work machine, the work machine comprising:
    a prime mover;
    a hydraulic tank configured to hold a supply of hydraulic fluid;
    a hydraulic pump fluidly connected to the tank and coupled to the prime mover;
    a suction line hose coupled at a first end to the pump and at a second end to the tank; and
    a vent valve, the vent valve including:
        a valve body having an axial passageway defined by an inlet chamber, an outlet chamber and a tapered seat therebetween, the inlet chamber being installed along the suction line hose, the outlet chamber being coupled to a vent line extending between the outlet chamber and the hydraulic tank;
        a float positioned in the outlet chamber; and
        a retainer positioned in the outlet chamber and dimensioned to retain the float in the outlet chamber.

15. The work machine of claim 14, wherein the float is a spherical float configured to seal the axial passageway when seated in the tapered seat.

16. The work machine of claim 14, wherein the retainer includes an outer crescent region connected to a center region dimensioned to retain the float in the outlet chamber.

17. The work machine of claim 14, wherein the retainer includes a tapered upper seat with a plurality of notches extending in an axial direction along a surface of the tapered upper seat.

18. The work machine of claim 14, wherein the float is spherical, hollow, and made from one of polypropylene plastic and Nylon 6/6.

19. The work machine of claim 14, wherein the vent line hose is connected to an upper region of the tank, and wherein the vent valve is installed at the highest point in the suction line.

20. The work machine of claim 19, further including a hose fitting fixed to the vent line hose, the hose fitting having a threaded exterior surface configured to engage a threaded interior surface of the valve body.

\* \* \* \* \*